United States Patent
Martin

[15] 3,706,434
[45] Dec. 19, 1972

[54] VEHICLE EJECTION SEATS

[72] Inventor: James Martin, Southland Manor, Southland Road, Denham near Uxbridge, England

[22] Filed: Feb. 26, 1968

[21] Appl. No.: 708,201

[30] Foreign Application Priority Data

March 17, 1967 Great Britain.....................12,777/67
April 19, 1967 Great Britain.....................18,055/67

[52] U.S. Cl............................................244/122 AD
[51] Int. Cl. ..............................................B64d 25/10
[58] Field of Search.......................................244/122

[56] References Cited

UNITED STATES PATENTS 3,190,589   6/1965   Mennborg...........................244/122

2,726,831   12/1955   Bleck....................................244/122

FOREIGN PATENTS OR APPLICATIONS 753,996   3/1967   Canada..............................244/122

Primary Examiner—Milton Buchler
Assistant Examiner—Barry L. Kelmachter
Attorney—Kurt Kelman

[57] ABSTRACT

The invention concerns an ejection seat having a rocket motor for assisting in the ejection sequence, the direction of the thrust line of the rocket motor being automatically alterable in response to movement of the pan of the seat with respect to the frame thereof so that the thrust line always passes approximately through the center of gravity of the seat/airman combination even though such center may move substantially as a result of airmen of differing heights using the seat.

18 Claims, 6 Drawing Figures

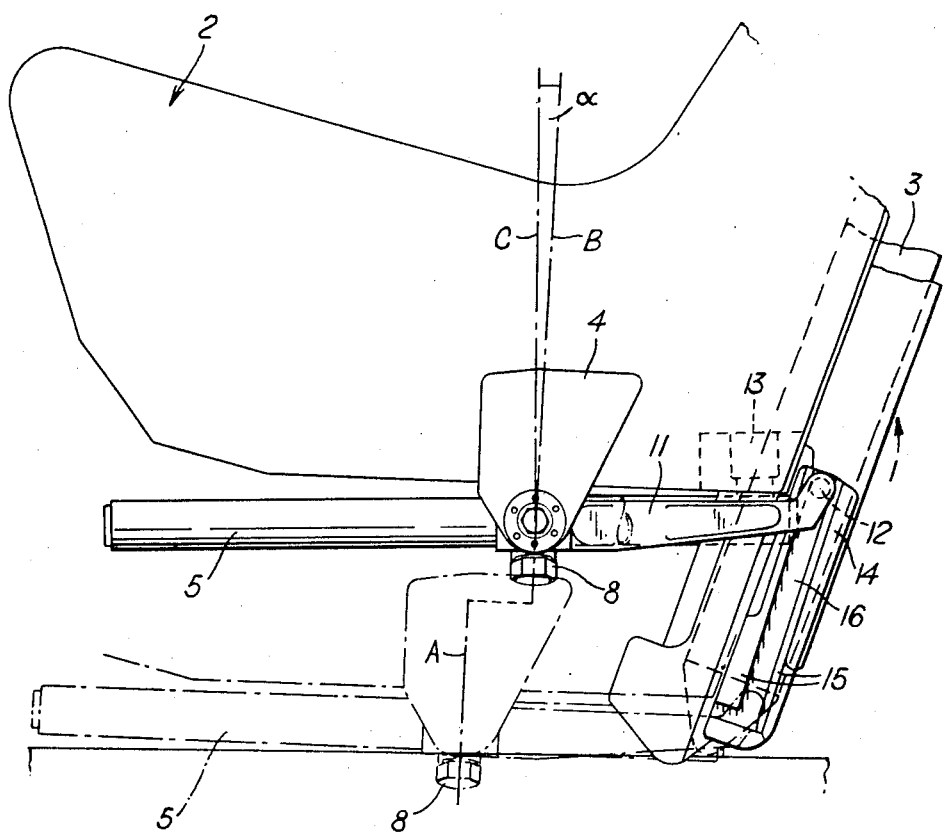

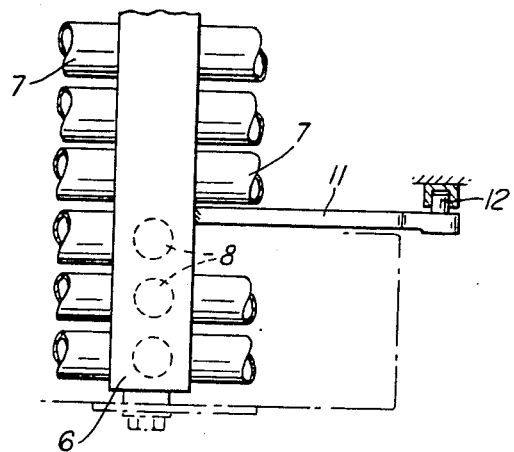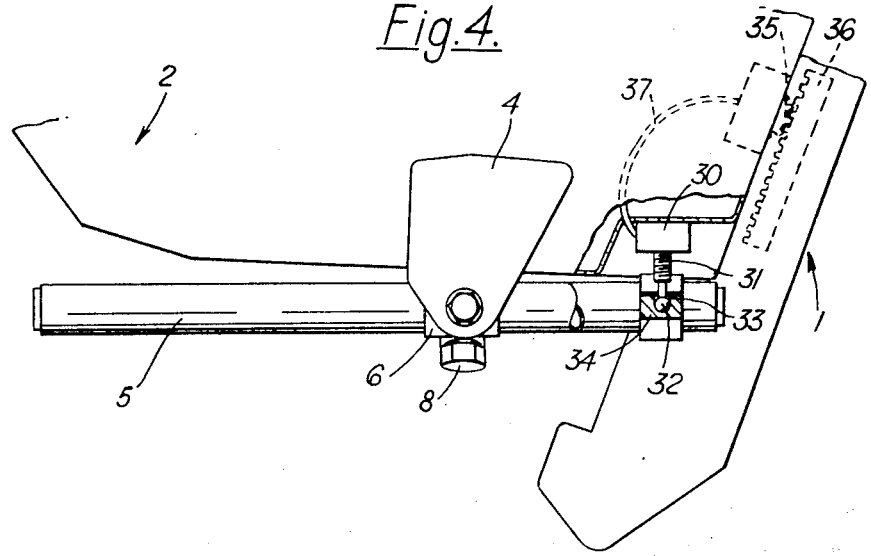

Inventor
JAMES MARTIN
By Kurt Kelman
AGENT

Inventor
JAMES MARTIN
By Kurt Kelman
AGENT

VEHICLE EJECTION SEATS

This invention concerns vehicle ejection seats and, whilst this invention is particularly concerned with airmen and aircraft ejection seats and will be described in relation thereto, the terms "aircraft ejection seat" and "airmen" should be understood herein to embrace any vehicle ejection seat and its occupant where the context so permits.

In aircraft ejection seats successfully adopted in practice in the past, ejection of the seat from the aircraft has been effected by means of an ejection gun alone or by means of an ejection gun in conjunction with a rocket motor. Ejection seats utilizing rocket motors in conjunction with ejection guns are the subject of, for example, my U.S. Pat. Nos. 3,186,662 and 3,124,324 and my British Patents Nos. 959,897; 959,898 and 959899.

In each of the aforementioned patents it is stressed that it is important that the thrust line of the rocket motor should pass through, or substantially through, the center of gravity of the seat/airman combination. Still further, in the British Patent Nos. 959,897 and 959,898, ejection seats are described in which provision is made for adjusting the position of the thrust line of the rocket motor.

One object of this invention is to provide an ejection system in which the present day requirements are more nearly met than hitherto, whilst another object is to provide an aircraft ejection system in which seat ejection is effected or assisted by an adjustable rocket motor which results in the trajectory of the ejected seat/airman combination being such as to enable safe ejection from an aircraft over a wide range of aircraft flight conditions including the zero-speed, zero-altitude case.

In earlier ejection seats proposed by me, the rocket motor (often a pack of rocket motors) has been adjusted with respect to the seat of the system using manually operated means actuated by airmen, such means being operationally independent of the remainder of the seat.

In such an arrangement, the adjustment of the position of the rocket motor pack is significant on the airman's weight moments about a selected (arbitary) datum, the appropriate weight moment value for each individual airman being ascertained by use of a suitable rig, such a rig being of the kind disclosed in my British Patent No. 959,900.

Unfortunately, it has been found that certain airmen fail to adjust such pack and if the height and build of the airmen failing to adjust their seat differs greatly from the height and build of the person for whom the seat has previously been set, then the thrust line of the rocket motor pack could fail to pass substantially through the center of gravity of the seat/airman combination. Thus, it will be appreciated that, to avoid such a possibility arising, it might be preferable not to have means for adjusting the pack or, alternatively, to have means which will automatically result in the pack being adjusted to a position where the thrust line at least in all instances passes reasonably close to such center of gravity of the combination.

Aircraft ejection seats normally comprise a seat pan mounted on a pair of beams constituting a framework (hereinafter referred to as the "seat frame") and the pan is usually adjustable with respect to the frame to suit airmen of differing heights, a short airman setting the pan high on the frame to ensure adequate vision out of the cockpit of the aircraft and also to ensure that he is correctly positioned with respect to the various controls of the aircraft and a taller airman, on the other hand, setting the seat pan at a lower position on the frame.

In circumstances where no provision is made for adjustment of the thrust line of the rocket motor pack, it is still possible to have (for a particular fixed position of the seat pan on the frame) the thrust line of the pack orientated in a position which would result in sufficiently close proximation of the thrust line of the center of gravity of the seat/airman combination even though airmen of widely varying heights and builds would use the seat. However, such close proximation of the thrust line becomes impossible once the seat pan is additionally adjusted to seat comfortably airmen of different heights and builds and, in fact, such movement of the pan results in substantial movement of the center of gravity of the combination with respect to the present direction of the thrust line of the pack. This movement of the center of gravity of the combination furthermore can be exaggerated, especially where a short airman selects for some special reason a particularly low seating position or when a tall airman selects a very high seating position. This latter situation sometimes arises during landing of an aircraft (in particular when the aircraft is to be landed on an aircraft carrier) because even tall airmen tend to raise the seat pan to a particularly high position to ensure that maximum visibility is attained.

Thus, according to one aspect of this invention there is provided an ejection seat comprising a seat frame; a seat pan adjustably mounted on the seat frame; an ejection gun coupled to said seat frame for at least initially ejecting said seat from an aircraft; at least one rocket motor for assisting ejection of the seat, said motor being mounted on said seat in such a manner that the direction of the thrust line thereof may be altered; and means responsive to relative movement between the seat pan and the seat frame for transmitting said relative movement to said rocket motor so that direction of the thrust line of the motor will depend upon the relative position of the pan with respect to the seat frame.

This movement of at least the discharge nozzles of the rocket motor will ensure that movement of the center of gravity of the seat/airman combination does not move substantially away from the direction of the thrust line as a result of movement of the seat pan with respect to the remainder of the seat.

Very conveniently, a pack of rocket motors may be provided on the seat, such pack being positioned beneath the seat pan and desirably being movable as a whole.

Whilst the rocket motor pack may be moved in any suitable direction in response to movement of the seat pan with respect to the seat frame, very desirably said pack may be moved angularly with respect to the seat rather than in a fore-and-aft direction towards the front or back of the seat.

Advantageously the rocket motor pack may be pivotally supported for limited rocking movement by a pair of dependent brackets extending downwardly from opposite sides of the seat pan and the direction of the thrust line of the pack may thus be altered as a result of canting of such pack with respect to these dependent brackets.

It will be understood that, whether the rocket motor or pack of rocket motors is movable angularly or fore-and-aft of the seat, such automatic movement of the rocket motor pack with respect to the seat frame to alter the direction of the thrust line thereof may be carried out in numerous alternative ways. For example, a screw jack may be carried by the seat and may be coupled to at least a part of said rocket motor or pack of motors, such jack being operated in response to movement of interengaging gear means provided between the seat pan and the seat frame due to relative movement between the pan and the frame. Likewise an arm may be coupled to at least a part of said rocket motor or pack of rocket motors, such arm carrying a cam follower which engages a cam surface on the seat frame, the arrangement being such that relative movement between the pan and the frame results in movement of the cam follower of the arm over the cam surface and this movement is transmitted to at least the said part of the rocket motor or pack of rocket motors.

In one particularly convenient arrangement, and in accordance with another aspect of the invention, there is provided an ejection seat comprising a seat frame; a seat pan adjustably mounted on the seat frame; an ejection gun coupled to said seat frame for at least initially ejecting said seat from an aircraft; at least one rocket motor for assisting ejection of the seat and pivotally mounted beneath the seat pan for movement as a whole with the seat pan but being movable angularly independently with respect thereto so that direction of the thrust line thereof may be altered; a non-extendable rigid arm being coupled to said rocket motor and extending away from the same; a cam follower being provided on said arm at a position remote from the pack; a cam provided on said seat frame having a cam face engaged by said cam follower, such face being formed by the substantially parallel walls defining a slot in the cam; the cam face being positioned with respect to said pivotal mounting of the motor so that the distance between the said pivotal connection and the cam surface progressively lessens as the seat pan moves in one direction with respect to the frame so that the cam follower to follow said cam surface said motor must move angularly with respect to the seat as a whole with the result that the direction of the thrust line of the motor is altered.

In order that the invention may be more readily understood, and further features of the same more fully appreciated, a series of embodiments of ejection seat in accordance with this invention will now be described by way of example, and with reference to, the accompanying drawings in which:

FIG. 1 is a side elevational view of the lower portion of an ejection seat, the seat pan of the seat and a rocket motor pack positioned thereunder being shown in full lines in a raised position with respect to the seat frame and in dot-and-pic lines in a lowered position, the rocket motor pack being rockable so that the thrust line direction thereof may be altered angularly, this figure depicting a preferred method of altering said thrust line direction;

FIG. 2 is a fragmentary plan view of the rocket motor pack of FIG. 1;

FIG. 4 is a fragmentary side elevational view showing a third method of angularly altering said thrust line direction;

Figure 3:
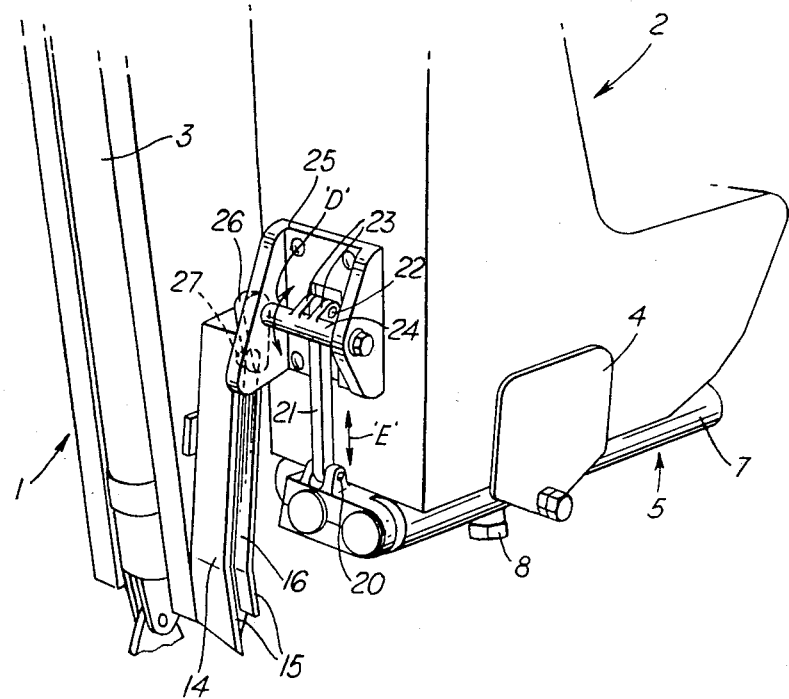
FIG. 3 is a perspective view taken from the rear and from one side of an ejection seat showing a second method of angularly altering the direction of the thrust line of a rocket motor pack situated beneath the pan of the seat.

In all of the embodiments shown in the accompanying drawings, an ejection seat is fragmentarily depicted which comprises a seat frame 1 and a seat pan 2, the seat pan 2 being adjustably mounted on the seat frame 1 for upward or downward movement with respect to the frame 1.

The seat frame 1 is itself mounted on guides in the vehicle and the seat is adapted to be ejected along the guides by an ejection gun diagrammatically illustrated and designated 3.

The seat pan 2 is adapted to be moved with respect to the seat frame 1 in a known manner and for simplicity such means are not illustrated. Such a system for moving the seat pan with respect to the seat frame is described in my British Patent No. 840,131.

Depending downwardly from opposite sides of the seat pan 2 are brackets 4 which support a rocket motor pack generally designated 5 and which comprises a tubular spine 6 extending across and beneath the seat pan 2 between said brackets 4 which carries a plurality of rocket propellant containing cannisters 7 which extend forwardly and rearwardly of the seat away from the spine 6. A plurality of outlets 8 are provided beneath said spine 6.

Figure 5:
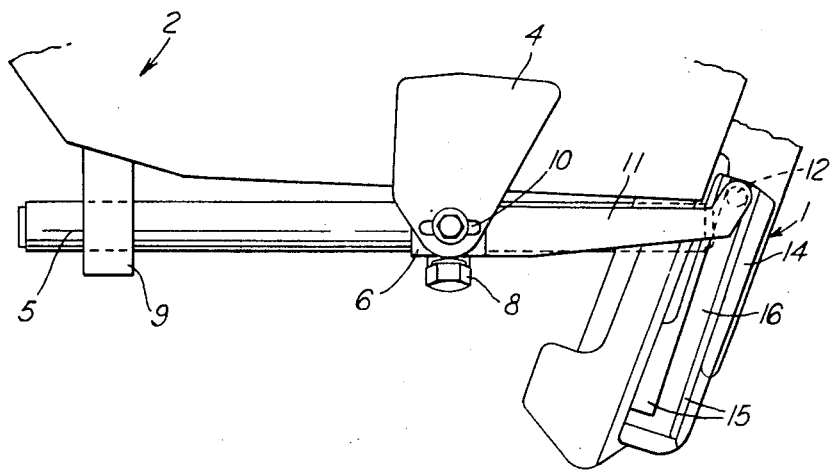
FIG. 5 is a view similar to FIG. 4 but showing a method of altering the direction of the thrust line by moving the rocket motor pack fore-and-aft to the seat.
Figure 6:
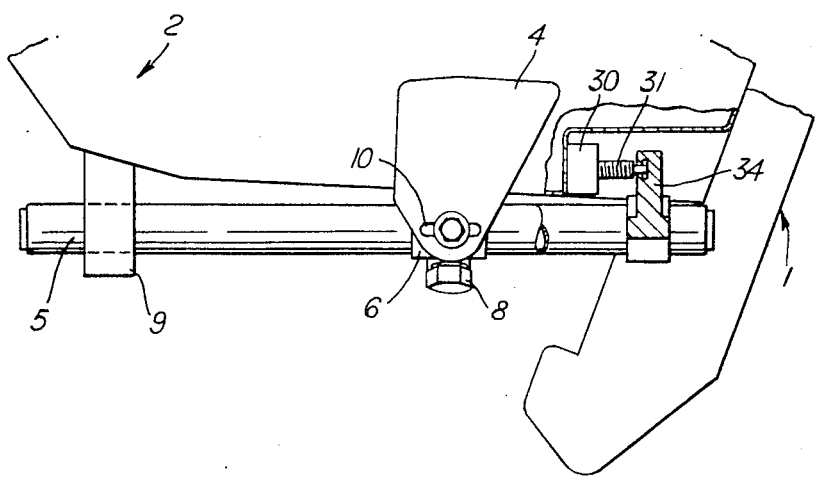
FIG. 6 is a further view, similar to FIGS. 4 and 5 showing a second method of moving the rocket motor pack fore-and-aft of the seat.

In the embodiments of FIGS. 1 to 4, the brackets 4 support the rocket pack 5 pivotally to enable the pack 5 to be rocked or canted with respect to the pan 2 whereas in the embodiments of FIGS. 5 and 6 the pack is prevented from moving angularly by apertured bracket 9 depending from the underside of the front portion of the seat pan 2, the brackets 4 being slotted at 10 to permit movement of the pack 5 as a whole fore-and-aft of the seat.

In the preferred embodiment of FIGS. 1 and 2, the pack 5 is provided with a non extensible rigid arm 11 rigidly secured to the spine 6, and extending rearwardly away from the spine 6, the end thereof remote from the spine 6 being upwardly cranked through 45° and carrying a cam follower 12 constituted by a transversely extending spigot (provided, if desired, with a rotatable sleeve).

The pack as a whole is biased, by means of a telescopic assembly 13 housing a tension spring, towards a position where the forwardly extending cannisters 7 are spaced away from the undersurface of the pan 2.

The seat frame 1 comprises basically a pair of spaced apart parallel beams between which the ejection gun 3 lies and bolted or otherwise rigidly secured to the lower end portion of one of these beams is a cam member 14.

The cam member 14 is provided with a pair of upstanding webs 15 which define a slot or channel 16, the interior surfaces of the webs which form the channel constituting parallel cam surfaces which are both engaged by the cam follower.

It will be understood that, when the pan 2 is moved with respect to the frame 1, the rocket motor 5 will move with the pan 2, with the result that the arm 11 and follower 12 will be forced to move in said channel 16 and will be forced to follow the contour of the cam faces.

In this embodiment, the cam faces are arranged so that the distance between the same and the pivotal connection of the spine 6 of the pack 5 to the brackets 4 lessens as the seat pan 2 moves in one direction with respect to the frame 1 so that, for the cam follower 12 to follow a path between such cam surfaces, said rocket motor pack 5 must move angularly with respect to the seat as a whole, with the result that the direction of the thrust line of the rocket motor pack 5 is altered. The A represents the thrust line direction of the rocket motor pack 5 when the seat pan 2 is in the lower position, the line B being a parallel extension of the line A. Line C on the other hand represents the thrust line direction of the rocket motor pack 5 when the pan 2 is in an upper position so that the angle alpha shows the extent of angular displacement of the thrust line resulting from movement of the seat pan from one position to another.

In the specific embodiment shown in FIG. 1, on moving the seat pan 2 by six inches from the first position to the second position, the cam follower spigot would move 6,399 inches along the cam slot 16 and the thrust line of the pack 5 would rock through an angle (alpha in the drawings) of 3°1'.

The second embodiment shown in FIG. 3 is similar to the embodiment of FIGS. 1 and 2 but the arm 11 is modified. In this second embodiment, the rocket motor pack 5 is pivotally connected at 20 by a link 21 which has its opposite end pivotally connected at 22 between a pair of radially disposed arms 23 extending from a shaft 24 mounted (for rotary movement about its longitudinal axis) by a bracket 25 on the seat pan 2. This shaft 24 also carries a radially extending arm 26 having a spigot 27 which constitutes a cam follower which engages cam faces provided by webs 15 on a cam 14 on the seat frame 1.

The cam follower may, if desired, carry a roller. The assembly formed by link 21, arms 23, shaft 24, and arm 26 effectively constitutes a bell-crank lever.

It will be appreciated that, with this latter arrangement, relative movement between the seat pan 2 and the seat frame 1 results in the cam follower 27 moving over the cam surfaces and movement of the follower 27 is transmitted by the shaft 24 (which rocks in the direction of arrow D) to said radially disposed arms 23 and from these arms through the link 21 (which moves in the direction of arrow E) to the rocket motor pack 5.

It will be apparent from the above description that the rocket motor pack will be moved to any one of a plurality of different positions in response to a corresponding number of differing seat pan positions with respect to the seat frame and that, as a result of the movement of the rocket motor pack, the thrust line direction thereof, will be altered.

It will be understood that the form of the linkage, cam follower and the cam is chosen so that the desired amount of movement of the rocket motor pack is attained in response to particular movements of the pan with respect to the frame to ensure that the thrust line of the pack extends at least approximately through the center of gravity of the seat/airman combination irrespective of the height of the airman in the seat.

Referring now to FIG. 4, a screw jack 30 having a screw 31 is carried on the underside of the seat pan 2, the screw 31 extending downwardly and terminating in a spherical end portion 32 located and retained in a socket 33 in an extension 34 on the pack. It will be understood that extension or retraction of the screw 31 will result in angular movement of the rocket motor pack 5 and alteration of the thrust line direction. Interengaging gear means in the form of a sprocket 35 on the pan 2 and a rack 36 on the frame 1 transmit, via any suitable means such as a bowden cable 37 or a gear box, relative movement of the seat pan with respect to the frame.

Turning now to the embodiments of FIGS. 5 and 6, it will be seen that the rocket motor pack in each arrangement is mounted for fore-and-aft movement with respect to the seat. The arrangement of FIG. 5 is identical to the arrangement of FIGS. 1 and 2 but, because the pack 5 is restrained against angular movement by bracket 9, the pack moves fore-and-aft of the seat when the cam follower 12 rides along the cam slot 16. Likewise the arrangement of FIG. 6 is very similar to the arrangement of FIG. 4 but in this embodiment the screw 31 of the jack 30 extends rearwardly of the seat. In FIG. 6 the drive mechanism for the jack (which may be identical to that shown in FIG. 4) has been omitted for simplicity. It should be appreciated, however, that the manner in which such relative movement between the seat frame and the seat pan is transmitted to the rocket pack adjusting mechanism may be varied in numerous ways.

In all the arrangements described above, the rocket motor pack as a whole is movable with respect to the seat. It should be noted however that, if desired, the pack may remain stationary and only the outlet(s) (or nozzle(s) defining the outlets where provided) need more angularly or fore-and-aft of the seat. Alternatively, a proportion of the rocket motors forming the pack may be adjustably mounted in the manner as described hereinbefore. It should be appreciated that the mechanism for providing automatic adjustment may, if required, be duplicated on the seat and in certain embodiments such a duplex system may be arranged so that one part of the mechanism adjusts one or more rocket motor outlets of the pack whilst the remaining part adjusts another one or more other outlets of the pack.

I claim:
1. An ejection seat in an aircraft, comprising
    1. a seat frame;
    2. a seat pan adjustably mounted on the seat frame for movement of the entire seat pan relative to the seat frame;
    3. an ejection gun coupled to said seat frame for at least initially ejecting said seat from the aircraft;
    4. at least one rocket motor for assisting the ejection of the seat, said motor having a thrust line and being adjustably mounted on said seat for altering the direction of the thrust line; and

1. means responsive to the relative movement between the entire seat pan and the seat frame for transmitting said relative movement to said rocket motor and thereby altering the direction of the thrust line of the motor in dependence upon the relative position of the entire pan with respect to the seat frame.

2. An ejection seat according to claim 1, wherein the rocket motor has at least one outlet movable angularly with respect to the ejection seat; and means are provided angularly to move said outlet with respect to the seat in response to said relative movement between the entire seat pan and the seat frame.

3. An ejection seat according to claim 2, wherein said means provided angularly to move at least said rocket motor outlet comprises a screw jack, the jack being pivotally coupled to the rocket motor and a part of the seat so that movement of the screw of the jack will alter the direction of the thrust line of the pack, intermeshing gear means being provided on the seat pan and frame and being drivingly engaged with the jack so that relative movement between the pan and the frame results in extension or retraction of the screw of the jack and alteration of the direction of the thrust line of the rocket motor.

4. An ejection seat according to claim 2, wherein said means for angularly moving at least said outlet of the motor comprises a cam and cam follower which is movable with respect to the cam.

5. An ejection seat according to claim 4, wherein the rocket motor and outlet thereof are normally not movable with respect to one another and a pivot is provided on the seat for mounting the motor angularly movably as a whole with respect to the seat, said means for angularly moving the rocket motor with respect to the seat comprising an arm carrying a cam follower, and a cam having a surface on said seat frame and engaged by the follower, the cam surface being arranged so that the distance from the pivot to said cam surface progressively lessens as the seat pan moves in one direction with respect to the seat frame.

6. An ejection seat according to claim 5, wherein the rigid arm comprises a bell-crank lever pivotally mounted, so as to be movable as a whole with the seat pan, one end portion of the lever being pivotally connected to the motor whilst the opposite end portion constitutes a cam follower engaging a cam surface on the seat frame, relative movement between the seat pan and frame resulting in angular movement of the bell-crank lever and angular movement of the rocket motor and of its thrust line with respect to the seat.

7. An ejection seat according to claim 5, wherein said rigid arm is rigidly coupled to said rocket motor so that the cam follower movement along said cam surface moves said motor angularly.

8. An ejection seat according to claim 1, wherein at least the outlet of the rocket motor is mounted for movement fore-and-aft of the seat, and is restrained against angular movement with respect to the same; and means are provided to move at least said outlet fore-and-aft of the seat in response to said relative movement between the seat pan and the seat frame.

9. An ejection seat according to claim 8, wherein the rocket motor and outlet thereof are normally not movable with respect to one another and the motor is mounted for movement as a whole fore-and-aft of the seat, said means for moving the rocket motor with respect to the seat comprising a rigid arm, rigidly coupled to the motor and carrying a cam follower, and a cam on said seat frame which is engaged by said follower, the cam surface of the cam being arranged so that the distance between the pivotal connection of the motor to the seat and said cam surface progressively lessens from one position of the cam surface to another.

10. An ejection seat according to claim 8, wherein said means provided for moving at least the rocket motor outlet fore-and-aft of the seat comprises a screw jack rigidly coupled to the motor and to a part of said seat so that movement of the screw of the jack will alter the direction of the thrust-line of the pack, intermeshing gear means being provided on the seat pan and frame and being drivingly engaged with the kack so that relative movement between the pan and the frame results in extension or retraction of the screw of the jack and alteration of the direction of the thrust line of the rocket 11. An ejection seat according to claim 1, wherein a pack of rocket motors is provided beneath the seat pan, at least the outlets of one of the motors of the pack being movable with respect to the seat.

12. An ejection seat according to claim 11, wherein at least a plurality of the motors forming the pack have at least one common outlet.

13. An ejection seat according to claim 1, wherein said responsive means is a cooperating means mounted on the seat frame and on the seat pan.

14. An ejection seat according to claim 1, wherein the seat pan has an immovable bottom part and said responsive means is connected between the immovable seat pan bottom part and the seat frame.

15. An ejection seat comprising
a seat frame;
a seat pan adjustably mounted on the seat frame;
an ejection gun coupled to said seat frame for at least initially ejecting said seat from an aircraft;
at least one rocket motor for assisting ejection of the seat and said motor being pivotally mounted beneath the seat pan for movement as a whole with the seat pan but being movable angularly and independently with respect thereto so that the direction of the thrust line thereof may be altered;
a non-extendable rigid arm being rigidly coupled to said rocket motor and extending away from the same;
a cam follower being provided on said arm at a position remote from the rocket motor;
a cam secured on said seat frame having a cam face engaged by said cam follower;
the cam face being positioned with respect to said pivotal mounting of the motor so that the distance between the said pivotal connection and the cam surface progressively lessens as the seat pan moves in one direction with respect to the frame so that for the cam follower to follow said cam surface said motor must move angularly with respect to the seat as a whole with the result that the direction of the thrust line of the motor is altered.

16. An ejection seat according to claim 15, wherein the cam follower comprises a projection extending transversely of the arm having at least a portion rotatable with respect to the arm and the cam surface is formed by substantially parallel walls of a slot formed in said cam.

17. An ejection seat according to claim 15 wherein said rocket motor comprises a plurality of individual rocket motors intercoupled by a common spine having at least two outlets, disposed substantially symmetrically of the mid-point of the spine; the spine extending transversely from side to side of the seat and being pivotally coupled to the seat.

18. An ejection seat according to claim 17, wherein said outlets are defined by nozzles.

* * * * *